United States Patent
Manterys et al.

(10) Patent No.: US 12,467,801 B2
(45) Date of Patent: Nov. 11, 2025

(54) ELECTRIC HARNESS MANUFACTURING SYSTEM AND TEST APPARATUS

(71) Applicant: Aptiv Technologies AG, Schaffhausen (CH)

(72) Inventors: Marek Manterys, Cracow (PL); Marcin Jakub Godlewski, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 229 days.

(21) Appl. No.: 18/115,351

(22) Filed: Feb. 28, 2023

(65) Prior Publication Data

US 2023/0273075 A1 Aug. 31, 2023

(30) Foreign Application Priority Data

Feb. 28, 2022 (GB) ..................................... 2202762
Jan. 17, 2023 (EP) ................................... 23151975

(51) Int. Cl.
*G01L 1/00* (2006.01)
*G01R 31/00* (2006.01)
*G01R 31/68* (2020.01)

(52) U.S. Cl.
CPC .............. *G01L 1/005* (2013.01); *G01R 31/68* (2020.01)

(58) Field of Classification Search
CPC ... G01L 5/0057; G01L 5/0033; G01L 5/0038; G01R 31/69
See application file for complete search history.

(56) References Cited

U.S. PATENT DOCUMENTS 4,211,108 A * 7/1980 Seitz ..................... G01L 5/0033
73/862.01
4,246,783 A * 1/1981 Steven ..................... G01L 1/22
376/245

(Continued)

FOREIGN PATENT DOCUMENTS

CN 203824681 * 9/2014 ............... G01L 5/00
CN 203824681 U 9/2014

(Continued)

OTHER PUBLICATIONS

English translation of CN 203824681 (Year: 2014).*
UKIPO Search Report for Application No. GB2202762.7; mailed Aug. 30, 2022; 4 pages.

*Primary Examiner* — Tran M. Tran
(74) *Attorney, Agent, or Firm* — Billion & Armitage

(57) ABSTRACT

A test apparatus for verifying plugging force of an electrical component having sockets for receiving one or more corresponding plugs in a push fit arrangement. The test apparatus includes a load plate with a support surface orthogonal to first and a second axes. A holder retains the first electrical component on the load plate. A plurality of load cells supports the load plate at spaced locations. A plugging force applied to the first electrical component via the second electrical component is transferred to the plurality of load cells. A processor is provided for receiving load cell data corresponding to the force applied to each load cell respectively. The processor determines the magnitude of the plugging force and the location at which the plugging force is applied to the first electrical component relative to the first and second axes of the load plate.

16 Claims, 5 Drawing Sheets

(56) References Cited

U.S. PATENT DOCUMENTS

| | | | | |
|---|---|---|---|---|
| 4,666,006 A * | 5/1987 | Wernimont | ............ | G01G 21/23 73/862.633 |
| 4,726,436 A * | 2/1988 | Fukuyama | ............ | G01L 1/2231 73/862.633 |
| 5,014,799 A * | 5/1991 | Sato | ............ | G01L 5/1627 73/862.632 |
| 5,388,467 A * | 2/1995 | Jereb | ............ | G01M 11/00 324/415 |
| 5,473,254 A * | 12/1995 | Asar | ............ | G01R 31/68 324/763.01 |
| 6,014,901 A * | 1/2000 | Boe | ............ | G01R 31/69 73/831 |
| 6,498,047 B2 * | 12/2002 | Kim | ............ | H01L 21/6835 73/760 |
| 6,860,757 B2 * | 3/2005 | Herrnring | ............ | H01R 31/02 177/264 |
| 6,900,641 B2 * | 5/2005 | Draggie | ............ | G01R 31/3278 324/415 |
| 8,099,857 B2 * | 1/2012 | Shelley | ............ | H01R 43/20 29/709 |
| 8,156,825 B2 * | 4/2012 | Diaz | ............ | G01L 5/0038 73/849 |
| 8,935,964 B2 * | 1/2015 | Pascucci | ............ | G01L 1/2243 73/862.632 |
| 8,984,928 B2 * | 3/2015 | Sumimoto | ............ | G01L 25/003 73/1.09 |
| 9,121,778 B2 * | 9/2015 | Diaz | ............ | G01N 3/42 |
| 9,459,173 B2 * | 10/2016 | White | ............ | A61B 5/1036 |
| 9,797,820 B2 * | 10/2017 | Masek | ............ | G01N 3/08 |
| 9,797,952 B2 * | 10/2017 | Ostmeier | ............ | G01R 31/3272 |
| 10,082,447 B2 * | 9/2018 | Estevo | ............ | G01R 1/00 |
| 10,371,564 B2 * | 8/2019 | Perez Jacome | ............ | G01G 19/415 |
| 10,488,457 B2 * | 11/2019 | Tsai | ............ | G01R 1/06794 |
| 10,753,810 B2 * | 8/2020 | Mastrogiacomo | ............ | G01L 1/16 |
| 11,171,438 B2 * | 11/2021 | Eagleton | ............ | H01R 43/26 |
| 11,175,352 B2 * | 11/2021 | Shultz | ............ | G01R 31/69 |
| 11,452,203 B2 * | 9/2022 | Szelest | ............ | G01R 31/2808 |
| 11,791,587 B2 * | 10/2023 | Hulscher | ............ | H01R 13/5205 439/587 |
| 11,954,252 B2 * | 4/2024 | Szelest | ............ | G06F 3/014 |
| 12,038,415 B2 * | 7/2024 | Wolff | ............ | G01L 5/0038 |
| 12,158,388 B2 * | 12/2024 | Yelle | ............ | G05G 9/047 |
| 2023/0087704 A1 * | 3/2023 | Buck | ............ | G01L 5/0057 324/538 |

FOREIGN PATENT DOCUMENTS

| | | |
|---|---|---|
| CN | 210322120 U | 4/2020 |
| CN | 214471451 U | 10/2021 |

* cited by examiner

ELECTRIC HARNESS MANUFACTURING SYSTEM AND TEST APPARATUS

CROSS-REFERENCE TO RELATED APPLICATION

This application claims benefit of priority to United Kingdom Patent Application No. GB 2202762.7 filed on Feb. 28, 2022, and European Patent Application No. EP 23151975.2 filed on Jan. 17, 2023, the entire disclosure of each of which is hereby incorporated by reference.

TECHNICAL FIELD OF THE INVENTION

The present disclosure relates to a test apparatus for verifying a plugging force during assembly of an automotive component, and in particular to an apparatus for verifying the magnitude and location of a plugging force relative to an electrical connection point.

BACKGROUND

Electrical components such as couplings, connectors, terminals, and fuses are tested during assembly to ensure that they are inserted correctly. A process control system may involve the testing of insertion forces during assembly to establish proper insertion. The withdrawal force may also be tested during an extraction or disassembly process. The application of a consistent insertion force is essential to ensure the security of the electrical connection and to avoid unintended release of the connectors while in use.

A known method for testing insertion forces uses insertion tools having electrical microswitches with springs maintaining a contact gap of the switch. The spring is selected such that compression under a given insertion force results in closure of the switch, which indicates that the required insertion force has been applied. Connection security is also reliant on the point of application of the insertion force. If the force is applied off-center, or away from the optimum point of application, it may be imbalanced and cause the connector to move out of correct alignment. As a result, the connector may not insert correctly and securely despite the application of the required insertion force.

Automotive connectors may experience significant vibrations and acceleration forces during operation of a vehicle. Such connectors must therefore be properly seated and connected to prevent connection failure while in use. An installation procedure for an automotive electrical component such as a fuse box may require an operator to apply a required verified insertion force, ensure that the component has 'clicked' into location, and then pull the wires of the component to confirm secure seating. This test is referred to as a 'push-click-tug' test. Following completion of the push-click-tug test a connector presence assurance (CPA) test is conducted to confirm that an electrical connection has been established and that there is electrical continuity.

In certain conditions it is possible that the connector may not be fully and accurately inserted despite each of the required testing steps being completed to the satisfaction of the operator. The insertion force and CPA tests may indicate that the connector has been correctly inserted despite the connector being misaligned or not fully seated. As a result, the connector may become disconnected while in use, or during installation in the vehicle.

It is therefore desirable to provide an improved test apparatus, which addresses the above described problems and/or which offers improvements generally.

SUMMARY

In an aspect of the disclosure, there is provided a test apparatus for verifying plugging force during assembly of a first electrical component having one or more electrical connection points for receiving one or more corresponding second electrical components in a push fit arrangement. The test apparatus includes a load plate having a support surface and orthogonally arranged first and a second axes defined parallel to the support surface. A holder is provided for retaining the first electrical component on the load plate. A plurality of load cells supports the load plate and are arranged at spaced locations about the load plate such that a plugging force applied to the first electrical component retained on the load plate, via the second electrical component, in a direction perpendicular to the support surface of the load plate is transferred to the plurality of load cells. A processor is provided for receiving load cell data from the load cells corresponding to the force applied to each load cell respectively. The processor is operative to determine the magnitude of the plugging force and the location at which the plugging force is applied to the first electrical component relative to the first and second axes of the load plate based on the load cell data and the location of the load cells relative to the load plate.

The first electrical component may be a fuse box and the second electrical component may be one or more fuses, which may include relays, connectors, or other attached components. The first and second axes are orthogonal x and y axes that are defined across the surface of the load plate. The term "holder" refers to any component capable of holding the first electrical component in a fixed location on the load plate during insertion of the second electrical components. The holder is also preferably able to hold the first electrical component in position on the load plate when a pulling force is applied to the second electrical component. The processor preferably includes a computer running software for performing the operations required of the processor. The term 'load cell data' may include electrical signals, digital information or any other load cell output.

The processor is preferably programmed with location information relating to the location of the one or more sockets of the first component on the load plate when the first electrical component is retained in the holder. The location information is x and y coordinates of each socket and the location at which the pushing force must be applied to each fuse or other component when it is inserted into the socket. The processor is operative to compare the determined x-y location of the point of application of the plugging force with the desired location and provide an output based on the comparison. The output may be an indication as to whether or not the plugging force was applied at the correct x-y location. The required x-y location may have a tolerance radius within which the point of the plugging force may be considered compliant.

The processor may be programmed with force information relating to the desired magnitude of the pushing force for each socket and is operative to compare the determined magnitude of the plugging force for each socket with the desired plugging force and provide an output based on the comparison. The desired magnitude is a minimum force threshold that must be met to provide suitable assurance that the second component has been fully seated within the socket and may be defined by the component manufacturer. The processor may also determine whether a maximum force threshold is reached above which there is risk of damage to first and/or second components and may provide an alert if the maximum threshold is reached.

A visual display unit may be provided, and the processor may be operative to display a visual representation of the load plate and the first electrical component on the visual display unit and to generate and display visual indicia of the location of the plugging force. The visual representation may be a pre-generated image such as a photograph or graphical representation of the load plate and first electrical component stored on a computer readable memory of the processor or may be a live image captured by a camera. The image may alternatively include an image of the first electrical component located on a 2D grid representative of the x and y coordinate of the load plate. The indicia may be graphical images superimposed on the visual representation indicating the point of application of the plugging force. The processor may also be operative to generate and display indicia of the magnitude of the plugging force. The force indicia may be separate from the location indicia or may be defined by the first indicia. For example, the first indicia may vary in size or color depending on the magnitude of the force.

The load cells are preferably mounted to a support structure at a first proximal end and are connected to the load plate at a second distal end. The support structure may be a support frame, a base plate located beneath the load cell, or any other structure suitable to support the load cells while they hold the load plate in a suspended arrangement. The load plate may include a third load axis (z-axis) arranged perpendicular to the first and second axes and the load cells are arranged to support the load plate in the direction of the third load axis. Preferably the load plate is horizontally arranged with the x and y axes being two orthogonal horizontal axes and the z axis being a vertical axis.

The load cells may include a plurality of strain gauges mounted on opposing upper and lower surfaces thereof. The load cells may be operative to determine the direction and the magnitude of a force applied to the load plate in the third load axis based on the output of the strain gauges.

The processor may be operative to determine, based on whether the load cell signals are positive or negative, whether the force applied to the load plate is a plugging force directed towards the support surface of the load plate or a pulling force directed away from the support surface of the load plate, the plugging and puling forces being in the third load axis.

The processor may be operative to verify a test procedure including a first step of inserting a second electrical component into a socket of the first electrical component and applying a plugging force to the second electrical component and a second step of pulling the second electrical component to ensure the second electrical component is properly seated in the socket. The processor is operative to verify the first step by determining the magnitude and location of the plugging force and comparing each with a required plugging force magnitude threshold and location relative to the first and second axes respectively, and wherein the processor is operative to confirm that the first steps has been conducted correctly if the plugging force is determined to have been applied at the correct location and to have met the plugging force threshold. The processor determines the x and y coordinate of the location at which the plugging force is applied, and compares this x-y location with the x and y co-ordinates of the required point of application to establish whether the plugging force has been applied at the correct location.

The processor may be operative to verify the second step by determining the magnitude of the pulling force and comparing this with a required pulling force threshold. The processor is operative to confirm that the second step has been conducted correctly if the pulling force is determined to have been applied at the correct location and to have met the pulling force threshold. The processor may also determine the location at which the pulling force is applied, which may be used to confirm for example that the correct fuse has been pulled.

The load plate may include a peripheral edge and the load cells are arranged about the periphery of the load plate. The load cells are preferably located beneath the load plate with the load plate being mounted thereon. The load plate may include a plate and support frame to which the plate is mounted. The load cells are preferably connected to the support frame of the load plate.

Each load cell is preferably mounted at a first end to a support element which may be a rigid structure which extends from the support element in a cantilever arrangement. The opposing second end is connected to the load plate. Preferably the load cells and the support elements are located beneath the load plate and within the perimeter or footprint of the load cell.

In another aspect of the disclosure a method of conducting a plugging force verification test is provided which includes the following steps:
  providing a test apparatus according to any preceding claim;
  inserting and retaining a first electrical component in the holder;
  inserting a second electrical component into a socket of the first electrical component and applying a plugging force thereto;
  using the test apparatus to verify whether the plugging force meets a plugging force threshold and whether the plugging force is applied at a predetermined required location relative to the first and second axes of the load plate.

The method may further include the steps of applying a pulling force to the second electrical component following insertion of the second electrical component and verifying whether the pulling force meets a pulling force threshold and is applied at a required location relative to the first and second axes.

The method may further include displaying an image of the electrical component on a display unit and indicating on the display the location and/or magnitude of the plugging force and/or pulling force.

The method may further include providing a feedback signal to the operator to confirm whether the plugging force threshold has been reached.

The method may further include providing an indication that the plugging force verification test has been successfully completed if it is determined that the plugging force threshold has been reached and the plugging force was applied at the correct location.

BRIEF DESCRIPTION OF THE DRAWINGS

The present invention is now described, by way of example with reference to the accompanying drawings, in which.

DETAILED DESCRIPTION

Figure 1:
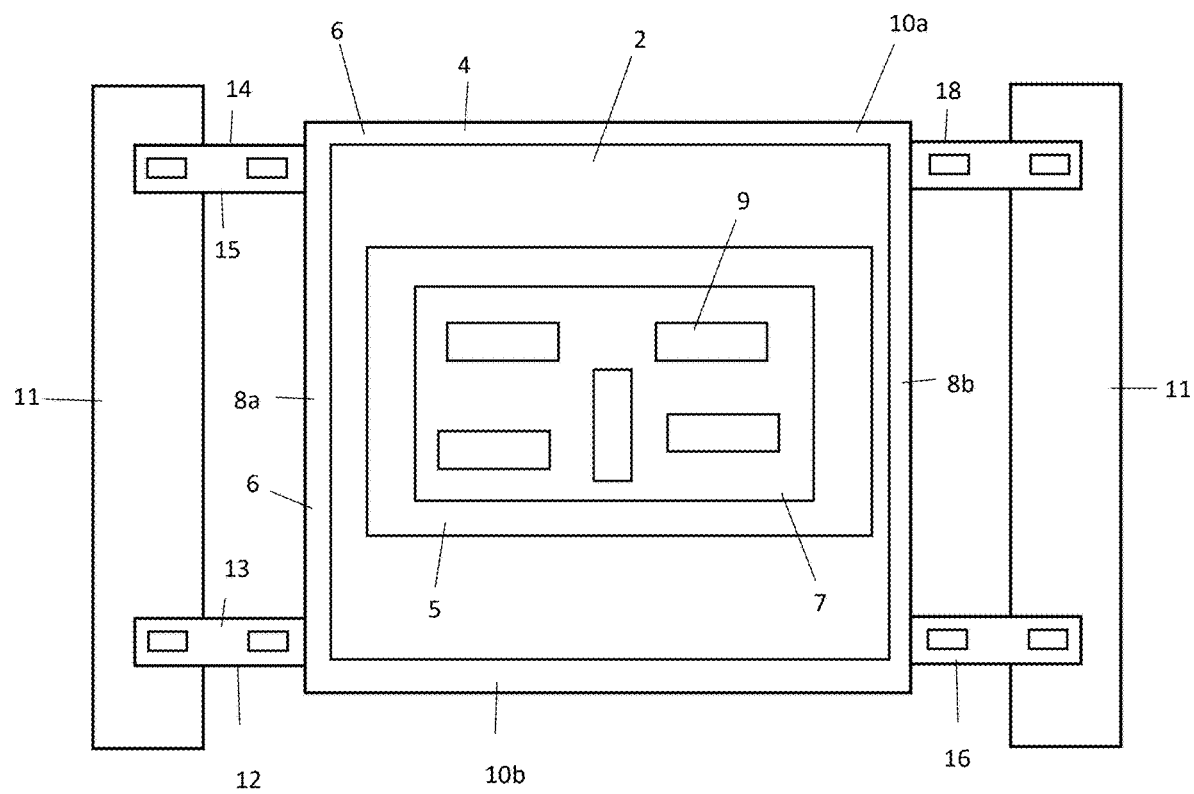
FIG. 1 is a perspective view of an electric harness manufacturing system and test apparatus according to some embodiments.

FIG. 1 illustrates a non-limiting example of an electric harness manufacturing system and test apparatus for testing the insertion of electrical automotive components which includes a horizontally arranged load plate 2 mounted on an inner frame 4. The load plate 2 includes a holder 5 located on its upper surface for receiving and holding a fuse box 7, having a plurality of electrical connection points 9 in the form of sockets to which a plurality of corresponding fuses is to be connected. However, it will be appreciated that the present disclosure could be applied to any electrical component or apparatus configured to receive one or more corresponding electrical connectors. The inner frame 4 includes four frame members 6 arranged in a square or rectangular formation. The frame members include a pair of first and second frame members 8a, 8b arranged in parallel with each other and a pair of third and fourth frame members 10a, 10b arranged in parallel with each other. The first and second frame members 8a, 8b are connected to the third and fourth frame members 10a, 10b and arranged orthogonally thereto.

The inner frame 4 is mounted to, and suspended within, an outer frame 11. The inner frame 4 is mounted to the outer frame 11 by a plurality of load cells spaced around the inner frame 4. A first load cell 12 and second load cell 14 are connected to the first frame member 8. The first and second load cells 12, 14 are spaced from each other along the first frame member 8 and are located at opposing ends of the first frame member 8 proximate the third and fourth 10a, 10b frame members respectively. The first and second load cells 12, 14 have an upper surface 13 and a lower surface 15. The first frame member 8a is mounted to the each of the first and second load cells 12, 14 at a spaced position above the upper surface 13 of each load cell 12, 14.

A guide pin 16 connects the first frame member 8 to each of the first and second load cells 12, 14. The guide pin 16 is rigidly secured to the inner end of the load cells 12, 14 and extends through the upper surface 13, 15. A first spring 18 is located about the guide pin 16 between the upper surface 13, 15 of the load cells 12, 14 and the lower surface of the first frame member 8a. The guide pin extends through the first frame member 8a and has an enlarged diameter head 22 located at its upper end. A second spring 20 is located about the guide pin 16 between the upper surface of the first frame member 8 and the head 22. The first frame member 8a is slidingly supported on the guide pins 16 and is able to move up and down away from and towards the load cells 12, 14. The first and second springs 18, 20 act as dampers as the first frame member 8 is urged downwardly or upwardly. Damping the connections between the load cells and inner frame, rather than providing a rigid connection, ensures that the load cells do not require recalibration following installation. A dampened connection also reduces tension in the frame and ensures an effective force distribution between load cells.

A third load cell 16 and fourth load cell 18 are connected to the second frame member 8b. The third load cell 16 and fourth load cell 16 are spaced from each other along the second frame member 8b and are located at opposing ends of the second frame member 8b proximate the third and fourth frame members 10, 11 respectively. The third and fourth load cells 16, 18 have an upper surface 17 and a lower surface 19. The second frame member 8b is mounted to the each of the third and fourth load cells 16, 18 at a spaced position above the upper surface 13 of the first and second load cells 12, 14. Similarly to the first frame member 8a, a guide pin 16 connects the second frame member 8b to each load cell 16, 18. The guide pin 16 is rigidly secured to the inner end of the load cells 16, 18. A first spring 18 is located about the guide pin 16 between the upper surface 17, 19 of the load cells 16, 18 and the lower surface of the second frame member 9. A second spring 20 is located about the guide pin 16 between the upper surface 17 of the second frame member 8b and the head 22. The second frame member 8b is slidingly supported on the guide pins 16 and is able to move up and down away from and towards the load cells 16, 18.

The load cells 12, 14, 16, 18 are tensometric beams and are connected to the inner frame 4 at their inner ends and at their outer ends to the outer frame 11. The outer ends of the load cells 12, 14, 16, 18 are connected to the outer frame in a cantilever arrangement, with the outer end of each load cell 12, 14, 16, 18 being mounted on an upper surface of the outer frame 11 and projecting inwardly from the outer frame 11 towards the inner frame 4. The distance between the point of connection of each load cell 12, 14, 16, 18 with the outer frame 11 and the point of connection of each load cell 12, 14, 16, 18 with inner frame 4 defines a lever arm.

The holder 5 is arranged to receive and hold the fuse box 7 such the fuse box 7 is secured rigidly within the holder 5 and relative to the inner frame 4. In this way, forces applied to the fuse box 7 are transferred to the inner frame 4 via the load plate 2. The load plate has a first horizontal x axis and a second horizontal y axis orthogonal to the x axis. The first and second inner frame members 8a, 8b are arranged along the x axis and the third and fourth frame members 10a, 10b are arranged along the y axis. A vertical z axis is defined orthogonally to the x and y axes. Vertical forces applied to the fuse box 7 in z axis are transferred to and distributed between the load cells 12. The load cells 12, 14, 16, 18 are configured and operative to measure the value of force vector applied to the load cell in z axis. The load cells 12, 14, 16, 18 are configured to measure the z axis force vector in both a positive direction corresponding to a downward 'pushing' force and a negative upwards 'pulling' force.

Figure 2:
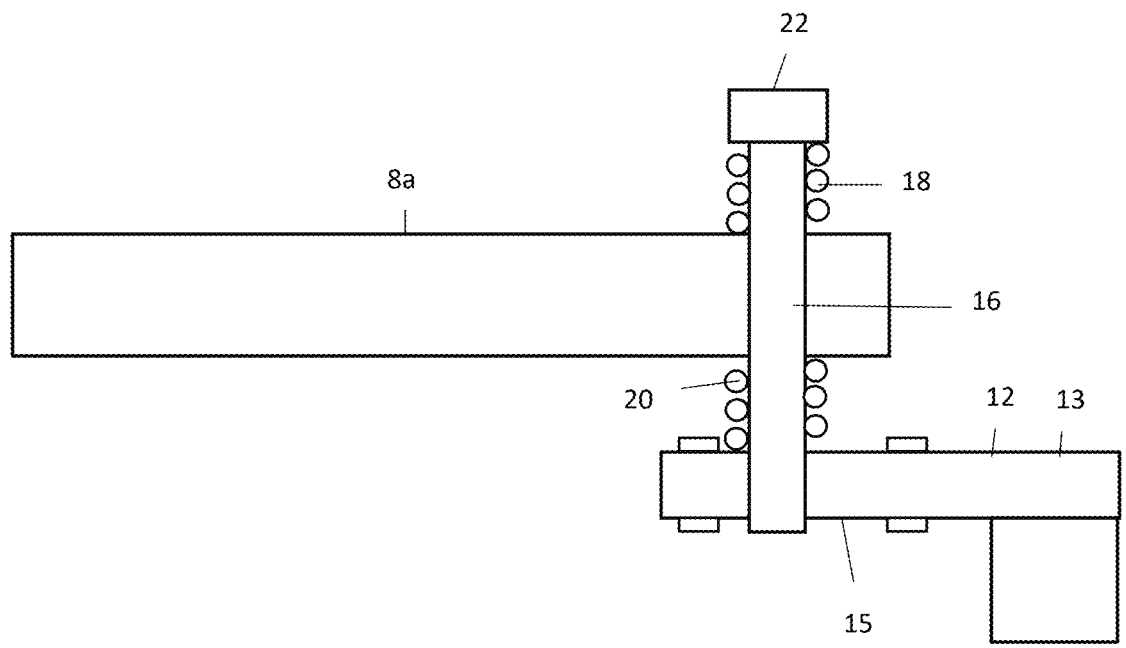
FIG. 2 is a side view of a test apparatus illustrating the damper arrangement of the load cell according to some embodiments.

The principle of operation of the load cells 12, 14, 16, 18 to measure the force applied to the load plate 2 relies on strain gauges provided on the outer surfaces of the load cells 12, 14, 16, 18 as shown in the FIG. 2. The strain gauges may for example include bonded metallic strain gauges consisting of very fine wires or a grid of metallic foil. A first pair of strain gauges 24, 26 are mounted in a spaced relationship along the length of the upper surface of each load cell 12, 14, 16, 18. A second pair of strain gauges 28, 30 are mounted in a spaced relationship along the length of the lower surface of each load cell 12, 14, 16, 18.

Figure 3:
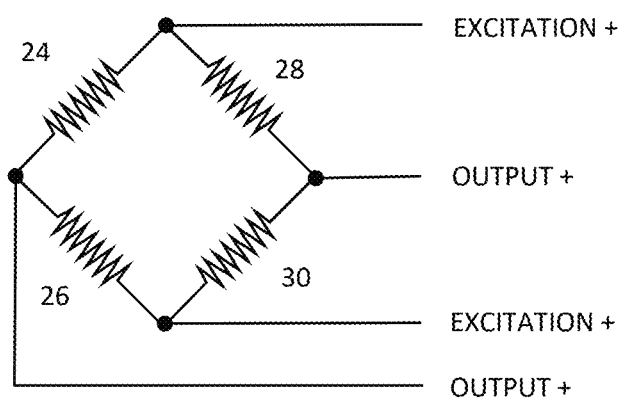
FIG. 3 is a circuit diagram of a load cell according to some embodiments.
Figure 4:
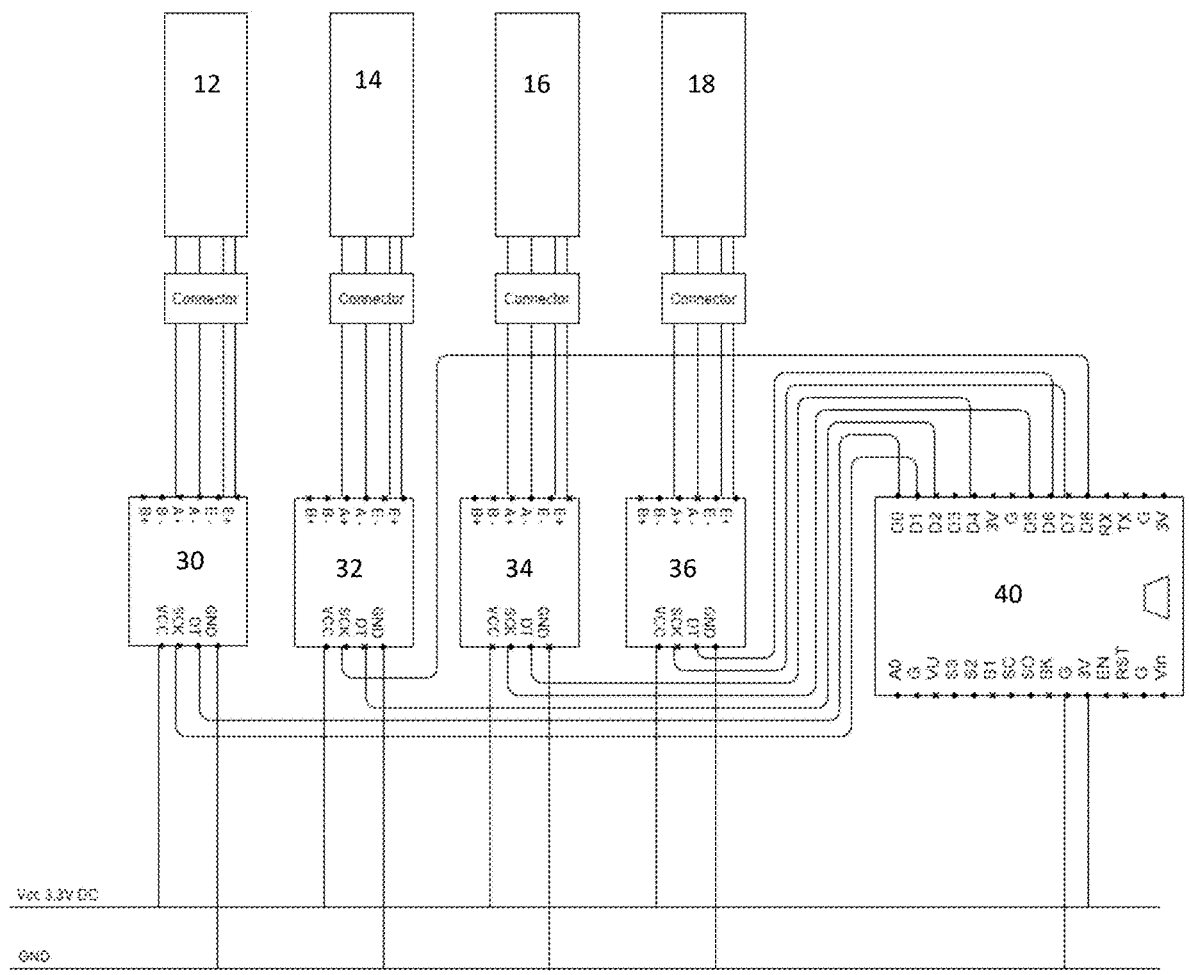
FIG. 4 is a circuit diagram of a series of load cells according to some embodiments.

The strain gauges of each load cell 12, 14, 16, 18 are connected respectively in a Wheatstone bridge as illustrated in FIG. 3. The output voltage Vo is measured as the difference between voltage output '+' and output '−' and varies according to the load applied load cell. As shown in FIG. 4, each load cell 12, 14, 16, 18 is connected to a dedicated PCB 30, 32, 34, 36 that is configured to function as a load cell amplifier. The output voltage signal Vo from each load cell 12, 14, 16, 18 is amplified by the dedicated load cell amplifier 30, 32, 34, 36, which converts the measured analog output Vo to a digital signal. The digital output signal from each load cell amplifier 30, 32, 34, 36 is transmitted to a microcontroller 40. The microcontroller converts the signal from each load cell amplifier 30, 32, 34, 36 to a value indicative of the load applied to each respective load cell 12, 14, 16, 18.

The force applied to the component received with the holder 5 is transferred to the load plate 2. The applied force is then divided between each of the load cells 12, 14, 16, 18. The x-y location of the applied force on the load plate can be determined based on the distribution of the force across each of the load cells 12, 14, 16, 18. A force is applied to the load plate 2 at an x-y location. The x and y axes are arranged relative to the load plate 2 and the load cells 12, 14, 16, 18 such that the first and fourth load cells 12, 18 (A, D) and the second and third load cells 14, 16 (B, C) are arranged at a common y locations respectively. The third and fourth load cells 16, 18 (C, D) and the first and second load cells 12, 14 (A, B) are arranged at a common x locations respectively. The first and fourth load cells 12, 18 (A, D) are arranged at $x_o$ and third and fourth load cells 16, 18 (C, D) are arranged at $y_o$.

During application of the applied force the inner frame 4 remains stationary. Therefore, the sum of torque applied across the load cells 12, 14, 16, 18 zero. The value of the force vector is the sum of the readings of all four load cells 12, 14, 16, 18:

Sum_12_14_16_18=scale_12_read+scale_14_read+ scale_16_read+scale_18_read

The x and y coordinates of the applied force are determined by calculating what part of the total force vector is measured by the load cells at common x-y locations respectively from the $x_o$, $y_o$ axis. The x and y are coordinates are therefore calculated as follows:

X=(scale_12_read+scale_14_read)/ Sum_12_14_16_18

Y=(scale_16_read+scale_18_read)/ Sum_12_14_16_18

The load cells 12, 14, 16, 18 are arranged such that the output of each load cell 12, 14, 16, 18 is positive if the force is applied is a positive i.e., downward direction and negative if the force is applied in the reverse upwards direction. The load cells 12, 14, 16, 18 may therefore be used to determine the magnitude, location and direction of applied forces during both 'push' test and a 'pull' test.

The microcontroller 40 may be an ESP-8266 microcontroller produced by Espressif Systems of Shanghai, China and is configured sample date from the load cell amplifiers 30, 32, 34, 36 at a high frequency and to process the load cell amplifier data to calculate the x and y coordinates and magnitude of the applied force. The microprocessor data may be supplied to a personal computer that provides a user interface for conducting the 'push-click-tug' tests. The personal computer is programmed with information relating to the shape and size of the fuse box or other component, the location of the sockets to which the connectors are to be supplied, and the required location of the applied force for each connector. The personal computer is also programmed with the x and y position of the holder 5 and fuse box on the load plate 2, and the x-y location of each socket.

The load cells are auto tared to zero the readings of each and account for the weight of the load plate 2 and the fuse box prior to the insertion of a component. This "auto tare" function is operated by the microcontroller. The auto tare function of the microcontroller includes detecting a stabilized reading from each load cell, indicating that the pushing or pulling forces have stopped, and auto taring the stabilized reading is detected. The auto tare procedure is completed following each push-click-tug test.

The x and y position of the applied force is calculated when a fuse is inserted. The position and magnitude of the applied force is cross referenced with the required force location and magnitude for the respective fuse. It is then determined whether the applied force is of sufficient magnitude and applied at the correct location. The user also establishes whether the fuse has clicked into location by manual and aural feedback. The user then applies a pulling force to fuse. The pulling force is also detected and cross referenced to determine whether it is of sufficient magnitude and applied at the correct location. If it is determined that the insertion (push) and retraction (pull) forces were applied and the correct locations and were of sufficient magnitude, a positive signal is generated indication that the test was conducted correctly.

The personal computer may additionally be provided with a graphical representation of the load plate and the fuse box, which may be a preloaded image or a live capture image of the load plate 2 from a camera. The image of the load plate is overlaid with an x and y grid and features of the image, including the periphery of the fuse box and the sockets are assigned x and y coordinates. A display image is generated including an image of the fuse box on the load plate 2, on which the location of applied force is represented based on the calculated x and y position. This real time visualization of the measured force vector relative to the fuse box provides immediate feedback to the operator. The system may be configured to provide audio and/or visual feedback of a successful or unsuccessful completion of the test. The software may be configured to enable the operator to vary parameters such as force thresholds and other settings.

The visual display may provide guidance to an operator during testing, for example indicating the required location of the applied force and/or the required force direction for a given test step, and verify the correct application of each step, The personal computer may be programmed with the configuration data for a range of electrical components and a range of corresponding test procedures and protocols. The system can therefore be adapted for applying any component plugging force verification test.

Figure 5:
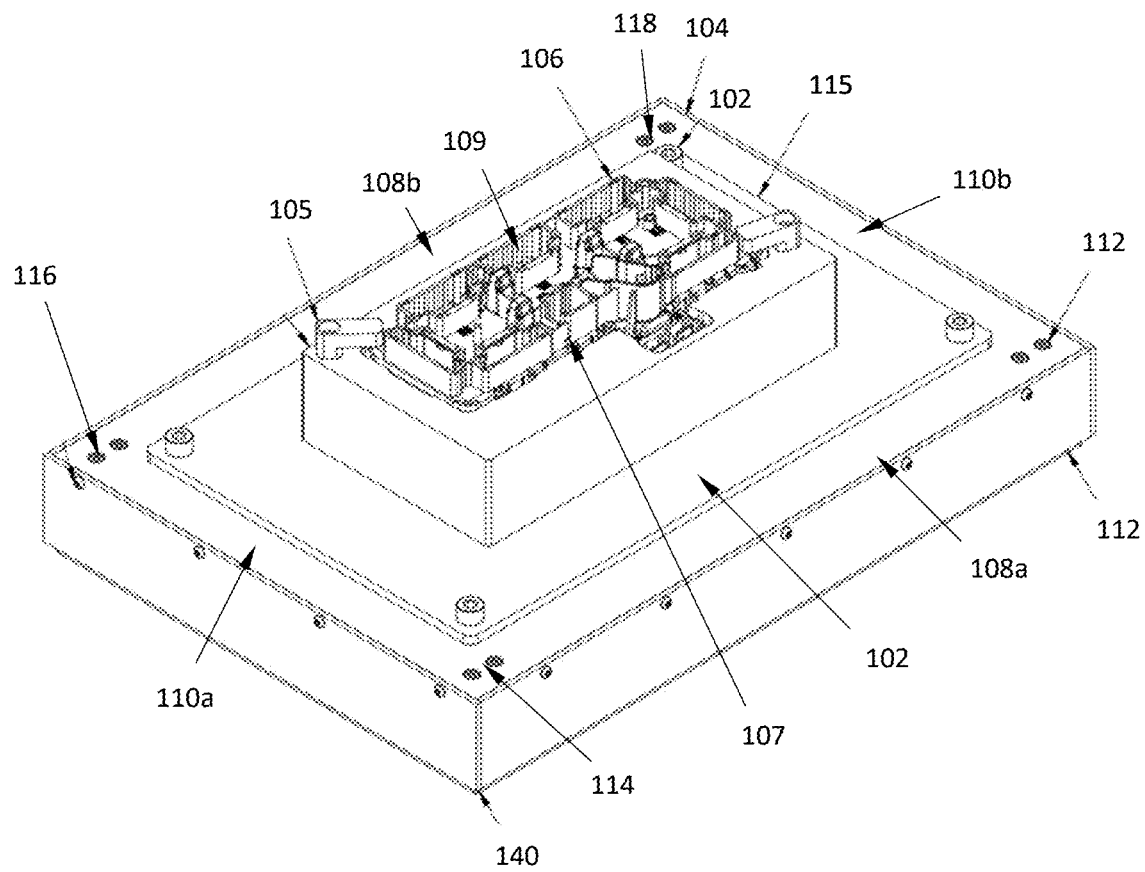
FIG. 5 is an illustrative view of a test apparatus according to some embodiments.

In an alternative embodiment, as shown in FIG. 5, a load plate 102 is mounted on a load plate frame 104. A holder 105 is located on the upper surface 115 of the load plate 102. The holder 105 has a recess shaped to receive a fuse box 107, having a plurality of sockets 109 to which a plurality of corresponding fuses is to be connected. The load plate frame 104 includes four frame member 106, a pair of first and second frame members 108a, 108b arranged in parallel with each other and a pair of third and fourth frame members 110a, 110b arranged in parallel with each other. The first and second frame members 108a, 108b are connected to the third and fourth frame members 110a, 110b.

Figure 6:
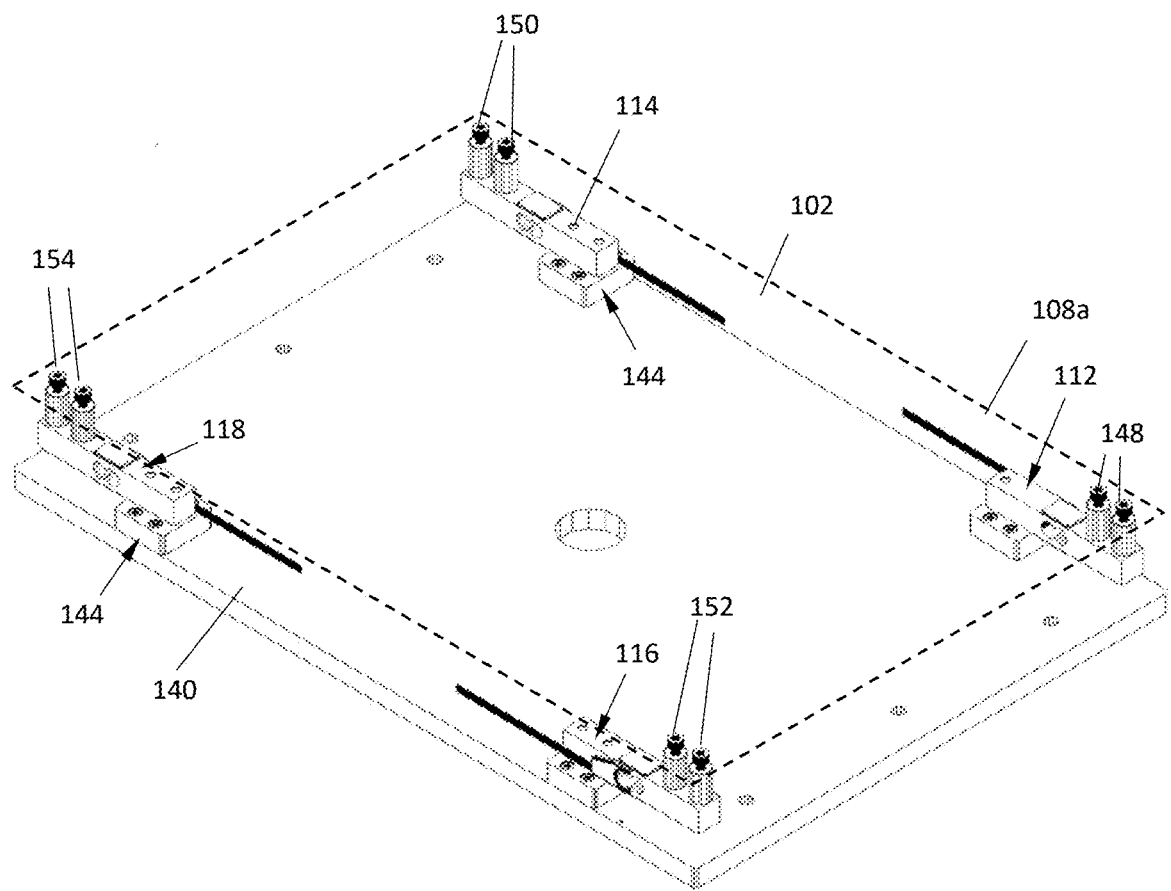
FIG. 6 is a view of the internal configuration of the apparatus of FIG. 5 according to some embodiments.

Load cells 112, 114, 116, 118 are mounted to a base plate 140. The base plate 140 is located beneath the load plate 102 and load plate frame 104. It will be appreciated, however, that in other embodiments the load plate may be supported directly on the load cells and may not require a load plate frame, with the load cells being connected directly to the lower surface of the load plate rather than a load plate frame. FIG. 6 shows base plate 140 and load cells 112, 114, 116, 118, with the load plate 102 represented in dashed line. The load cells 112, 114, 116, 118 are each mounted to the base plate 140 by a rigid support block 144 that spaces the first end of each of the load cells 112, 114, 116, 118 from the base plate 140. The load cells 112, 114, 116, 118 extend horizontally from the respective support block 144 in a cantilever arrangement. The first and second load cells 112, 114 are longitudinally aligned with the first frame member 108a and the edge of the load plate 102. The first load cell 112 is spaced beneath the first frame member 108a and is connected to a first end of the first frame member 108a by a first pair of rubber dampers 148. The support block 144 is located inwardly of the first end along the length of the first frame member 108a. The second load cell 114 is similarly spaced beneath the first frame member 108a and is connected to a second end of the first frame member 108a by a second pair of rubber dampers 150. The support block 144 of the second load cell 114 is located inwardly of the second end along the length of the first frame member 108a. The first and second dampers 148, 150 provide a dampened connection between the first frame member 108a and the first and second load cells 112, 114.

The third and fourth load cells 116, 118 are connected to the base plate 140 and second frame member 108b in a similar manner. The third and fourth load cells 116, 118 are longitudinally aligned with the second frame member 108b, which is located on the opposing side of the inner frame 4 top the first frame member 108a. The third load cell 116 is spaced beneath the second frame member 108b and is connected to a first end of the second frame member 108b by a third pair of rubber dampers 152. The damper member of the third frame member 110a is located inwardly of the first end along the length of the second frame member 108b. The fourth load cell 118 is connected to a second end of the second frame member 108b by a fourth pair of rubber dampers 154. The damper member of the fourth load cell 118 is located inwardly of the second end along the length of the second frame member 108b. The load plate frame 104 is therefore supported in this embodiment by load cells 112, 114, 116, 118 in a cantilever arrangement in which the load cells 112, 114, 116, 118 are mounted to the base plate 140 within the footprint of the load plate frame 104 and extend outwardly towards the outer edges of the load plate frame 104 rather than being mounted to an outer frame and extending inwardly towards the load plate frame 104 as in the first embodiment, thereby enabling a more compact arrangement.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A test apparatus for verifying plugging force during assembly of a first electrical component having one or more electrical connection points for receiving one or more corresponding second electrical components in a push fit arrangement, the test apparatus comprising;
    a load plate having a support surface and orthogonally arranged first and a second axes defined parallel to the support surface;
    a holder for retaining the first electrical component on the load plate;
    a plurality of load cells supporting the load plate arranged at spaced locations about the load plate such that a plugging force applied to the first electrical component retained on the load plate in a direction perpendicular to the support surface of the load plate is transferred to the plurality of load cells; and
    a processor for receiving load cell data from the load cells corresponding to the force applied to each load cell respectively, wherein the processor is operative to determine a magnitude of the plugging force and the location at which the plugging force is applied to the first electrical component relative to the first and second axes of the load plate based on the load cell data and the location of the load cells relative to the load plate.

2. The test apparatus according to claim 1, wherein the processor is programmed with location information relating to the location of the one or more electrical connection points of the first component on the load plate when the first electrical component is retained in the holder, and a desired location of the pushing force for each electrical connection point, and is operative to compare the determined point of application of the plugging force with the desired location and provide an output based on the comparison.

3. The test apparatus according to claim 1, wherein the processor is programmed with force information relating to a desired magnitude of the pushing force for each electrical connection point and is operative to compare the determined magnitude of the plugging force for each electrical connection point with the desired plugging force and provide an output based on the comparison.

4. The test apparatus according to claim 1, further comprising a visual display unit and wherein the processor is operative to display on the visual display unit a visual representation of the load plate and the first electrical component and to generate and display a visual indicium of the location of the plugging force.

5. The test apparatus according to claim 1, wherein the load cells are mounted to a support structure at a first proximal end and are connected to the load plate at a second distal end.

6. The test apparatus according to claim 1, wherein the load plate comprises a third load axis arranged perpendicular to the first and second axes and wherein the load cells are arranged to support the load plate in the direction of the third load axis.

7. The test apparatus according to claim 6, wherein the load cells are operative to determine the direction and the magnitude of a force applied to the load plate in the third load axis.

8. The test apparatus according to claim 7, wherein the processor is operative to determine whether the force applied to the load plate is a plugging force directed towards the support surface of the load plate or a pulling force directed away from the support surface of the load plate in the third load axis, based on the load cell data.

9. The test apparatus according to claim 8, wherein the processor is operative to verify completion of a test procedure comprising a first step of inserting a second electrical component into a socket of the first electrical component and applying a plugging force to the second electrical component and a second step of pulling the second electrical component to ensure the second electrical component is properly seated in the socket; wherein the processor is operative to verify completion the first step by determining the magnitude and location of the plugging force and comparing each with a required plugging force magnitude threshold and location relative to the first and second axes respectively, and wherein the processor is operative to confirm that the first step has been conducted correctly if the plugging force is determined to have been applied at a correct location and to have met the plugging force threshold.

10. The test apparatus according to claim 9, wherein the processor is operative to verify the second step by determining the magnitude of the pulling force and comparing this with a required pulling force threshold and wherein the processor is operative to confirm that the second step has been conducted correctly if the pulling force is determined to have met the pulling force threshold.

11. The test apparatus according to claim 9, wherein the processor is operative to determine a position of the pulling force and compare the determined position with a required position to confirm the pulling force is applied to the correct second electrical component.

12. The test apparatus according to claim 6, wherein the load plate comprises a peripheral edge and the load cells are arranged about a periphery of the load plate and wherein a damper member is located between each load cell and the load plate.

13. The test apparatus according to claim 6, wherein a damper member is located between each load cell and the load plate.

14. The test apparatus according to claim 1, wherein the one or more electrical connection points comprise electrical sockets and the one or more second electrical components comprise a plug element configured to be received by the one or more respective sockets.

15. A method of conducting a plugging force verification test, comprising:
provided a test apparatus for verifying plugging force during assembly of a first electrical component having one or more electrical connection points for receiving one or more corresponding second electrical components in a push fit arrangement, the test apparatus having:
a load plate having a support surface and orthogonally arranged first and a second axes defined parallel to the support surface,
a holder for retaining the first electrical component on the load plate,
a plurality of load cells supporting the load plate arranged at spaced locations about the load plate such that a plugging force applied to the first electrical component retained on the load plate in a direction perpendicular to the support surface of the load plate is transferred to the plurality of load cells, and
a processor for receiving load cell data from the load cells corresponding to the force applied to each load cell respectively, wherein the processor is operative to determine a magnitude of the plugging force and the location at which the plugging force is applied to the first electrical component relative to the first and second axes of the load plate based on the load cell data and the location of the load cells relative to the load plate;
inserting a first electrical component in the holder;
inserting a second electrical component into a socket of the first electrical component and applying a plugging force thereto;
verifying whether the plugging force meets a plugging force threshold; and
verifying whether the plugging force is applied at a required location relative to the first and second axes.

16. The method according to claim 15, further comprising:
applying a pulling force to the second electrical component following insertion of the second electrical component; and
verifying whether the pulling force meets a pulling force threshold.

* * * * *